United States Patent
Cypher et al.

(10) Patent No.: US 9,148,371 B1
(45) Date of Patent: Sep. 29, 2015

(54) CONFIGURING NETWORKS USING BALANCED INCOMPLETE BLOCK DESIGNS

(75) Inventors: Robert Cypher, Saratoga, CA (US); Robert Ashby Armistead, III, Los Altos, CA (US)

(73) Assignee: Google Inc., Mountain View, CA (US)

( * ) Notice: Subject to any disclaimer, the term of this patent is extended or adjusted under 35 U.S.C. 154(b) by 608 days.

(21) Appl. No.: 12/981,874

(22) Filed: Dec. 30, 2010

(51) Int. Cl.
*H04L 12/28* (2006.01)
*H04L 12/775* (2013.01)

(52) U.S. Cl.
CPC ...... *H04L 45/583* (2013.01); *H04Q 2213/1338* (2013.01)

(58) Field of Classification Search
CPC .................. H04L 45/583; H04Q 2213/1338
USPC .......................................................... 370/254
See application file for complete search history.

(56) References Cited

U.S. PATENT DOCUMENTS

| | | | | |
|---|---|---|---|---|
| 5,243,704 | A * | 9/1993 | Baty et al. ...................... | 710/100 |
| 2004/0156322 | A1* | 8/2004 | Mehra ........................... | 370/254 |
| 2005/0080836 | A1* | 4/2005 | Chopping et al. ............ | 709/200 |

OTHER PUBLICATIONS

Aupperle, B.E.; "Fault-Tolerant BIBD Networks;" Computing Research Laboratory, Department of Electrical Engineering and Computer Science, The University of Michigan, Ann Arbor, MI 48109; Nov. 1987; 20 pages.

Dietz, H.G.; "Compiler Techniques for Flat Neighborhood Networks;" College of Engineering, Electrical Engineering Department, University of Kentucky, Lexington, KY 40506-0046; 2001; pp. 244-258.

* cited by examiner

*Primary Examiner* — Ayaz Sheikh
*Assistant Examiner* — Hai-Chang Hsiung
(74) *Attorney, Agent, or Firm* — Edward A. Gordon; Foley & Lardner LLP

(57) ABSTRACT

Methods for configuring networks and systems including nodes and switches. In one aspect, a method includes selecting a (v, b, r, k, λ) balanced incomplete block design (BIBD), wherein the BIBD includes v elements and b blocks of k elements, each element of the v elements is in r blocks of the b blocks, and each distinct pair of elements of the v elements is in λ blocks of the b blocks. Nodes are connected to switches. Each node is assigned to a different element of the BIBD. Each switch is assigned to a different block of the BIBD. For each switch, the switch is connected to the nodes assigned to the elements included in the block assigned to the switch.

16 Claims, 2 Drawing Sheets

| Block | Elements in the block | | | |
|---|---|---|---|---|
| B0 | 2 | 4 | 5 | 6 |
| B1 | 1 | 3 | 4 | 5 |
| B2 | 1 | 2 | 3 | 6 |
| B3 | 0 | 3 | 5 | 6 |
| B4 | 0 | 2 | 3 | 4 |
| B5 | 0 | 1 | 4 | 6 |
| B6 | 0 | 1 | 2 | 5 |

(v, b, r, k, λ): (7, 7, 4, 4, 2), element: {0, 1, 2, 3, 4, 5, 6}

CONFIGURING NETWORKS USING BALANCED INCOMPLETE BLOCK DESIGNS

BACKGROUND

The present disclosure relates to configuring data communication networks.

Networks typically include computers and various networking devices to connect the computers. For example, routers and switches can connect computers in a network. An example network is a computer cluster that includes a group of computers working together to perform tasks. For example, a data center can house a group of computers connected on a local area network (LAN) that provide services to client devices using the Internet. Some networks include redundant networking devices so that computers on the network can still communicate when some of the network devices fail. Redundant networking devices can also be used for load balancing.

SUMMARY

A network is configured using a balanced incomplete block design (BIBD). The network includes nodes and switches that connect the nodes. Given the number of nodes, the number of switches each node can connect to, and the number of nodes each switch can connect to, a BIBD is used to configure the network to maximize the number of switches that connect any given distinct pair of nodes.

In general, one innovative aspect of the subject matter described in this specification can be embodied in methods that include the actions of identifying a plurality of nodes, each node including a device configured to receive and send data on the network; identifying a plurality of switches, each switch being configured to receive and send data on the network; selecting a (v, b, r, k, λ) balanced incomplete block design (BIBD), wherein the BIBD includes v elements and b blocks of k elements, each element of the v elements is in r blocks of the b blocks, and each distinct pair of elements of the v elements is in λ blocks of the b blocks; and connecting nodes to switches, including: assigning each node to a different element of the BIBD; assigning each switch to a different block of the BIBD; and for each switch, connecting the switch to the nodes assigned to the elements included in the block assigned to the switch.

These and other embodiments can each optionally include one or more of the following features. The actions further include scaling the BIBD to create a resulting design having a total number of blocks greater than or equal to a total number of switches. Each node has u available ports, r evenly divides u, and scaling the BIBD comprises replacing each block with $$\frac{u}{r}$$

blocks having the same elements as the block. The actions further include scaling the BIBD to create a resulting design having a total number of elements greater than or equal to a total number of nodes. Each switch has d available ports, and scaling the BIBD comprises replacing each of the v elements with a set of s vertices wherein $$s = \text{floor}\left(\frac{d}{k}\right).$$

In the case where k*s<d, one or more remaining ports on a first switch may be connected to a different network.

In general, another aspect of the subject matter described in this specification can be embodied in systems that include a plurality of nodes, each node including a device configured to receive and send data on a network; and a plurality of switches, each switch being configured to receive and send data on the network; wherein each switch is connected to one or more nodes according to a block design based on a (v, b, r, k, λ) balanced incomplete block design (BIBD), wherein the BIBD includes v elements and b blocks of k elements, each element of the v elements is in r blocks of the b blocks, and each distinct pair of elements of the v elements is in λ blocks of the b blocks, and wherein: each node is assigned to a different element of the block design; each switch is assigned to a different block of the block design; and each switch is connected the nodes assigned to the elements included in the block assigned to the switch.

These and other embodiments can each optionally include one or more of the following features. The block design comprises the BIBD scaled to have a total number of blocks equal to a total number of switches. Each node has u available ports, r evenly divides U, and the BIBD is scaled by replacing each block with $$\frac{u}{r}$$

blocks having the same elements as the block. The block design comprises the BIBD scaled to have a total number of elements greater than or equal to a total number of nodes. Each switch has d available ports, and the BIBD is scaled by replacing each of the v elements with a set of s vertices wherein $$s = \text{floor}\left(\frac{d}{k}\right).$$

In the case where k*s<d, one or more remaining ports on a first switch may be connected to another network.

Particular embodiments of the invention can be implemented to realize one or more of the following advantages. A network including nodes and switches can be configured to increase λ, where λ is the minimum, over all distinct pairs of nodes a and b, of the number of switches connected to both a and b. In general, increasing λ increases the ability of the network to balance traffic flows across links and switches and to tolerate failures of links and switches. A network having a λ of at least one enables routing between any pair of nodes, which may be difficult to achieve using conventional techniques. The network can be configured with a simple, regular structure to simplify routing and wiring. A network configuration design can be determined that is constructive rather than simply defining constraints.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
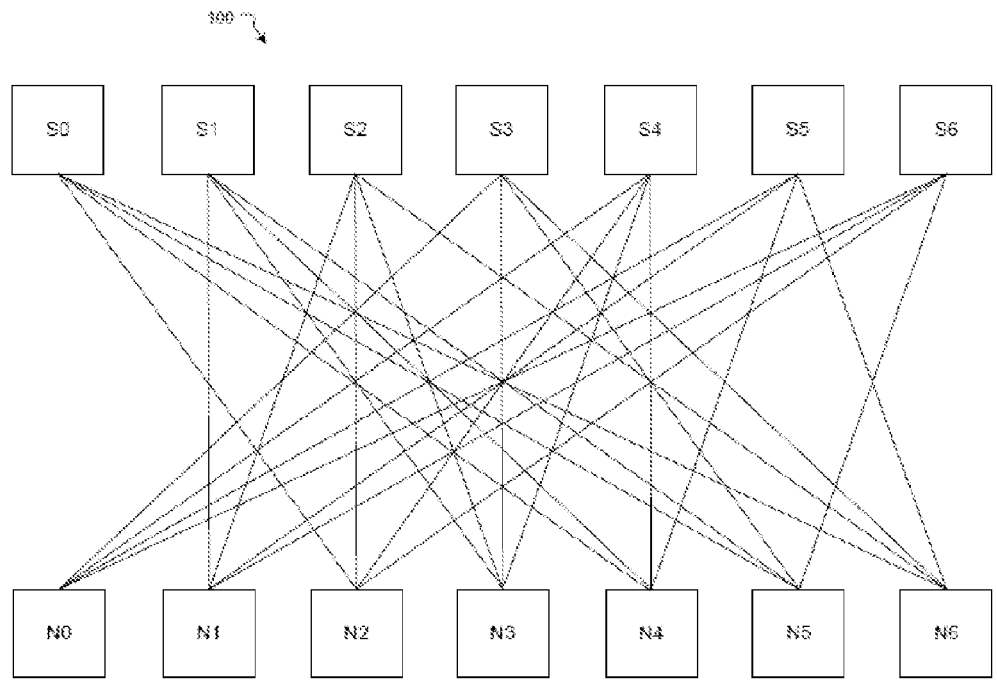
FIG. 1 is a block diagram of an example network configured using a balanced incomplete block design.

FIG. 1 is a block diagram of an example network 100 configured using a balanced incomplete block design (BIBD). The network 100 includes nodes N0-N6 and switches S0-S6.

A switch is a device that connects devices or networks. A switch has multiple ports and can send and receive data on each port. A switch can receive data on a first port and send the data on another port. For example, a switch may be a network bridge that routes data using Transmission Control Protocol/Internet Protocol (TCP/IP). For the example network 100 of FIG. 1, each switch can connect to four nodes.

A node is one or more devices that can send and receive data on the network 100. For example, a node may be a computer, a rack of computers (e.g., connected together by a switch), a switch, or a router. Each node can connect to a number of switches that are external to the node. For the example network 100 of FIG. 1, each node can connect to four external switches.

A BIBD is a mathematical construct that meets conditions given by a set of parameters (v, b, r, k, λ). A BIBD given by (v, b, r, k, λ) is a set of v elements. The BIBD includes b blocks of elements. A block of elements is a subset of the v elements. Each block includes exactly k elements, each element is in exactly r blocks, and each pair of distinct elements is in exactly λ blocks. The parameters (v, b, r, k, λ) are not independent. In particular, the following relationships can be proven:

$$v*r=b*k, \text{ and}$$

$$r*(k-1)=\lambda*(v-1).$$

Given the parameters (v, b, r, k, λ), a BIBD for those parameters can be identified using various techniques. For example, tables of BIBDs have been published. One book including tables of BIBDs is "Handbook of Combinatorial Designs," Second Edition, edited by Charles J. Colbourn and Jeffrey H. Dinitz. The tables can be consulted to determine a BIBD given values for the parameters. In another example, a computer can determine a BIBD given values for the parameters.

The term BIBD can also refer to a complete block design. A complete block design includes v elements where the blocks are all possible sets of size k.

A BIBD can be illustrated using a table. Table 1 illustrates an example (7, 7, 4, 4, 2) BIBD that includes the elements {0, 1, 2, 3, 4, 5, 6}. The rows of the table represent the blocks of the BIBD, labeled B0-B6. The columns represent the elements that are included in each block. The table 150 is also illustrated in FIG. 1.

TABLE 1

| Block | Elements in the block | | | |
|---|---|---|---|---|
| B0 | 2 | 4 | 5 | 6 |
| B1 | 1 | 3 | 4 | 5 |

TABLE 1-continued

| Block | Elements in the block | | | |
|---|---|---|---|---|
| B2 | 1 | 2 | 3 | 6 |
| B3 | 0 | 3 | 5 | 6 |
| B4 | 0 | 2 | 3 | 4 |
| B5 | 0 | 1 | 4 | 6 |
| B6 | 0 | 1 | 2 | 5 |

The example BIBD illustrated in Table 1 can be used to configure the example network 100. To configure the network 100, each of the seven nodes is assigned to one of the elements of the BIBD. Node N0 is assigned to element 0, node N1 is assigned to element 1, and so on. Each of the seven switches is assigned to one of the blocks of the BIBD. Switch S0 is assigned to block B0, switch S1 is assigned to block B1, and so on. For each switch, the switch is connected to the nodes that are assigned to the elements in the block assigned to the switch. For example, switch S0 is assigned to block B0 which includes elements 2, 4, 5, and 6. Those elements are assigned to nodes N2, N4, N5, and N6, so switch S0 is connected to those nodes.

The value for λ for the example BIBD is two. Consequently, each node in the network 100 is connected to every other node by two switches. Thus, if any single switch fails, each node will still be able to communicate with any other node.

Figure 2:
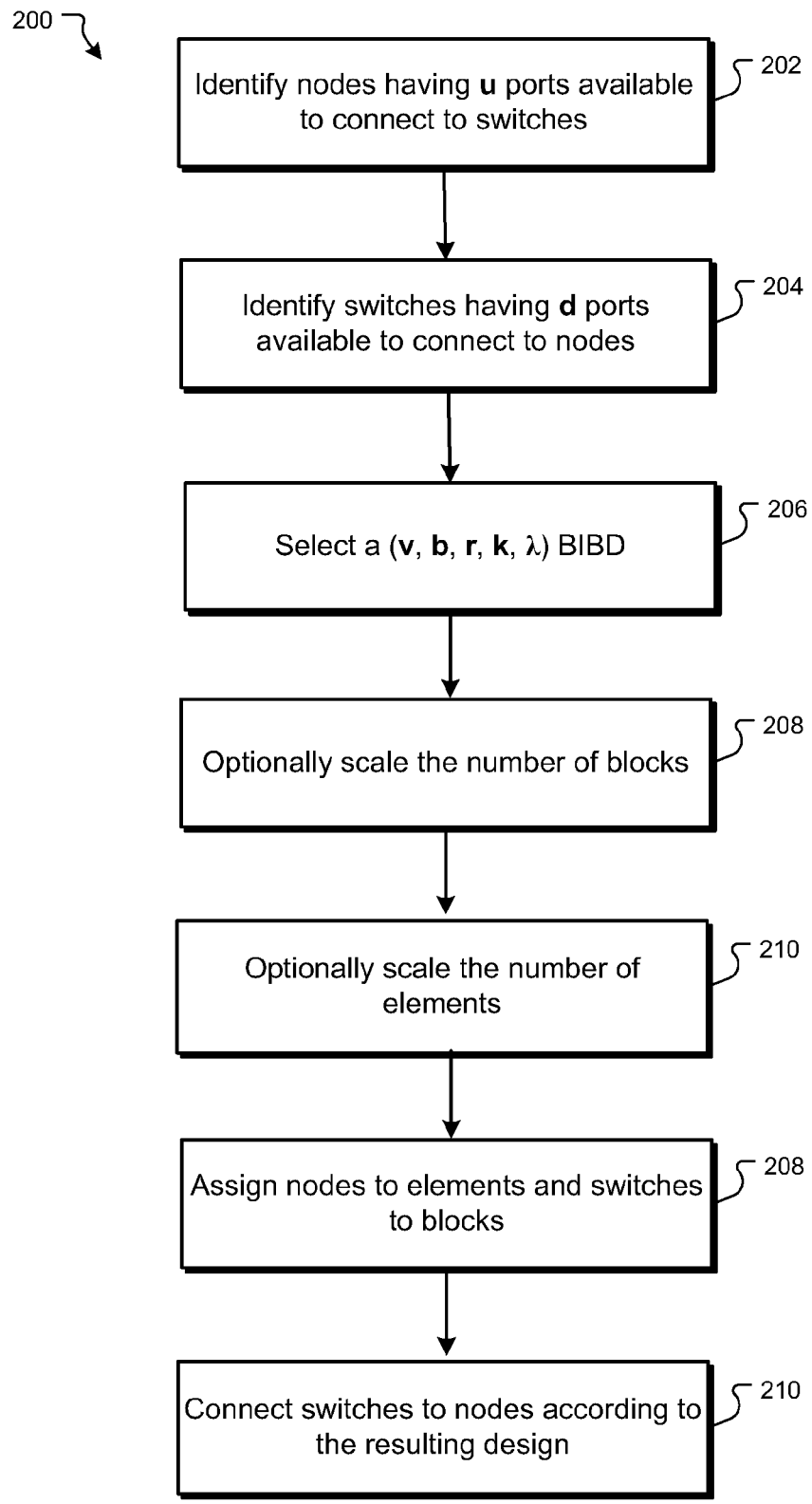
FIG. 2 is a flow diagram of an example technique for configuring a network using a balanced incomplete block design.

FIG. 2 is a flow diagram of an example technique 200 for configuring a network using a BIBD. The network includes nodes and switches that correspond to elements and blocks of a block design based on a BIBD. The technique 200 can be performed, for example, by a person (e.g., a network engineer). In some implementations, the person uses a computer to complete some steps of the technique 200.

Nodes for the network are identified (step 202). For example, each node may be a rack of computers connected together by a switch. Each node has u ports available to connect to switches. For example, where each node is a rack of computers, each node may have a switch having a number of ports for connecting the computers in the rack and at least u ports in addition to the ports for connecting the computers.

Switches for the network are identified (step 204). Each switch has d ports available to connect to nodes. The switches are used to connect the nodes of the network.

A (v, b, r, k, λ) BIBD is selected (step 206). The parameter r is based on u, the number of ports available to connect to the network on each nodes. Typically, r evenly divides u. For example, where each node has 24 ports available to connect to the network (u=24), r can be 1, 2, 3, 4, 6, 8, 12, or 24. b, v, and k are parameters relating to the number of switches, the number of nodes, and the number of ports available on each switch. A BIBD can be selected for values of b, v, and k not matching those values and adjusted as described in steps 208 and 210. λ is based on, for example, a target level of reliability for the network, or a target ability of the network to load balance traffic flows.

The selected BIBD is optionally scaled so that the number of blocks in the BIBD is equal to the number of switches for the network (step 208). The BIBD is scaled when the number of switches for the network is not equal to the value b used in selecting the BIBD in step 206. In some implementations, the number of blocks in the BIBD is scaled by a factor $$\frac{u}{r}$$

by replacing each block with $$\frac{u}{r}$$

blocks that contain the same elements. In those implementations, the result of the scaling is a (v, b*(u/r), u, k, λ*(u/r)) BIBD.

The selected and scaled BIBD is optionally further scaled so that the number of elements is equal to the number of nodes in the network (step 210). The BIBD is scaled when the number of nodes in the network is not equal to the value v used in selecting the BIBD in step 206. In some implementations, the number of elements in the BIBD is scaled by a factor of s, where $$s = \text{floor}\left(\frac{d}{k}\right)$$

by replacing each of the v elements with a set of s vertices. In those implementations, all of the v elements in such a set are included in the same set of blocks, and each resulting block includes k*s elements.

Selecting and scaling the BIBD results in a design that may or may not still be a BIBD. In implementations where the selected BIBD is scaled by $$\frac{u}{r}$$

blocks and s elements, there are a total of $$b * \frac{u}{r}$$

blocks and v*s elements. Each block contains k*s elements and each element is in u blocks. Each distinct pair of elements is contained in at least $$\lambda * \frac{u}{r}$$

blocks. In those implementations, the resulting design is typically no longer a BIBD because distinct pairs of elements within the same set of s elements are contained in u of the blocks, instead of $$\lambda * \frac{u}{r}$$

blocks. The resulting design can be referred to as a (v*s, b*(u/r), u, k*s, λ*(u/r)) design even though it is no longer a BIBD.

Nodes are assigned to elements of the resulting design and switches are assigned to blocks (step 208). The scaling performed in steps 208 and 210 ensures that there are as many nodes as there are elements and that there are as many switches as there are blocks.

Switches are connected to nodes according to the resulting design (step 210). For each switch, the switch is connected to nodes that are assigned to elements within the block assigned to the switch. In general, switches are connected to nodes using a physical transmission medium. For example, a copper or optical interconnect may be used.

In the resulting network, each node connects to u switches, and each switch connects to k*s nodes, where k*s≤d. Thus, the network can be configured so that all available ports on each node are connected to the network. If k*s<d, the remaining ports on each switch can be configured, for example, for communication within the network or with other networks. In the resulting network, each distinct pair of nodes can communicate with one another using at least $$\lambda * \frac{u}{r}$$

distinct switches.

To illustrate the technique 200, consider the following example. A network is going to have 840 nodes and 42 switches. Each node has 24 ports available to connect to switches, and each switch has 512 ports available. Thus, u=24 and d=512. A network engineer determines that λ=2 will provide a desired level of reliability.

The network may be configured by first selecting the (7, 7, 4, 4, 2) BIBD illustrated in Table 1. That BIBD has a λ value of 2, but it only has 7 elements and 7 blocks, and thus not enough elements or blocks to have each node correspond to an element or each switch correspond to a block. Thus, the BIBD will be scaled.

To scale the number of blocks, the number of blocks is scaled by a factor of 24/4=6. Thus, each block is replaced with 6 blocks that contain the same elements as the original block. The resulting BIBD is a (7, 42, 24, 4, 12) BIBD having the elements {0, 1, 2, 3, 4, 5, 6}. Table 2 illustrates the resulting BIBD.

TABLE 2

| Block | Elements in the block | | | |
|---|---|---|---|---|
| B0 | 2 | 4 | 5 | 6 |
| B1 | 2 | 4 | 5 | 6 |
| B2 | 2 | 4 | 5 | 6 |
| B3 | 2 | 4 | 5 | 6 |
| B4 | 2 | 4 | 5 | 6 |
| B5 | 2 | 4 | 5 | 6 |
| B6 | 1 | 3 | 4 | 5 |
| B7 | 1 | 3 | 4 | 5 |
| B8 | 1 | 3 | 4 | 5 |
| B9 | 1 | 3 | 4 | 5 |
| B10 | 1 | 3 | 4 | 5 |
| B11 | 1 | 3 | 4 | 5 |
| B12 | 1 | 2 | 3 | 6 |
| B13 | 1 | 2 | 3 | 6 |
| B14 | 1 | 2 | 3 | 6 |
| B15 | 1 | 2 | 3 | 6 |
| B16 | 1 | 2 | 3 | 6 |
| B17 | 1 | 2 | 3 | 6 |
| B18 | 0 | 3 | 5 | 6 |
| B19 | 0 | 3 | 5 | 6 |
| B20 | 0 | 3 | 5 | 6 |
| B21 | 0 | 3 | 5 | 6 |
| B22 | 0 | 3 | 5 | 6 |

TABLE 2-continued

| Block | Elements in the block | | | |
|---|---|---|---|---|
| B23 | 0 | 3 | 5 | 6 |
| B24 | 0 | 2 | 3 | 4 |
| B25 | 0 | 2 | 3 | 4 |
| B26 | 0 | 2 | 3 | 4 |
| B27 | 0 | 2 | 3 | 4 |
| B28 | 0 | 2 | 3 | 4 |
| B29 | 0 | 2 | 3 | 4 |
| B30 | 0 | 1 | 4 | 6 |
| B31 | 0 | 1 | 4 | 6 |
| B32 | 0 | 1 | 4 | 6 |
| B33 | 0 | 1 | 4 | 6 |
| B34 | 0 | 1 | 4 | 6 |
| B35 | 0 | 1 | 4 | 6 |
| B36 | 0 | 1 | 2 | 5 |
| B37 | 0 | 1 | 2 | 5 |
| B38 | 0 | 1 | 2 | 5 |
| B39 | 0 | 1 | 2 | 5 |
| B40 | 0 | 1 | 2 | 5 |
| B41 | 0 | 1 | 2 | 5 |

The resulting BIBD has 42 blocks labeled B0-B41 and thus has enough blocks so that each switch can be assigned to a block. However, there are only 7 elements, and thus not enough so that each of the 840 nodes can be assigned to an element.

The number of elements is scaled by a factor $$s = \text{floor}\left(\frac{512}{4}\right) = 128.$$

So each of the 7 elements is replaced with a set of 128 vertices. The resulting design has 7*128=896 elements. Each element can be expressed in the form x.y where $0 \leq x \leq 6$ and $0 \leq y \leq 127$. For example, the first block B0 originally included the elements {2, 4, 5, 6}. After scaling, that block will include the 4*128=512 elements of the form {2.y1, 4.y2, 5.y3, 6.y4} for all values of y1, y2, y3, and y4 such that $0 \leq y1 \leq 127$, $0 \leq y2 \leq 127$, $0 \leq y3 \leq 127$, and $0 \leq y4 \leq 127$. The resulting design is an (896, 42, 24, 512, 12) design.

The network can now be configured by assigning nodes to elements and switches to blocks. For each switch, the switch is connected to nodes assigned to elements within the block assigned to the switch. Each distinct pair of nodes is connected by at least 12 distinct switches.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method for configuring a network, the method comprising:
    identifying a plurality of nodes, each node including a device configured to receive and send data on the network and having u available ports;
    identifying a plurality of switches, each switch being configured to receive and send data on the network;
    selecting a (v, b, r, k, λ) balanced incomplete block design (BIBD) based on a plurality of characteristics of the identified plurality of nodes and the identified plurality of switches, wherein the BIBD includes v elements and b blocks of k elements, each element of the v elements is in r blocks of the b blocks, and each distinct pair of elements of the v elements is in λ blocks of the b blocks, and wherein selecting the BIBD comprises selecting r based on u and selecting r so that r evenly divides u;
    scaling the BIBD to create a resulting design having a total number of blocks equal to a total number of switches by replacing each block with $$\frac{u}{r}$$

blocks having the same elements as the block; and
    connecting nodes to switches, including:
        assigning each node to a different element of the resulting design;
        assigning each switch to a different block of the resulting design; and
        for each switch, connecting the switch to the nodes assigned to the elements included in the block assigned to the switch.

2. The method of claim 1, further comprising scaling the BIBD to create a second resulting design having a total number of elements greater than or equal to a total number of nodes.

3. The method of claim 2, wherein each switch has d available ports, and scaling the BIBD comprises replacing each of the v elements with a set of s vertices wherein $$s = \text{floor}\left(\frac{d}{k}\right).$$

4. The method of claim 1, wherein the plurality of characteristics includes the number of the plurality of nodes, the number of ports available on each node, the number of the plurality of switches, and the number of ports available on each switch.

5. The method of claim 1, further comprising scaling the resulting design to create a second resulting design having a total number of elements greater than or equal to a total number of nodes.

6. The method of claim 5, wherein each switch has d available ports, and scaling the second resulting design comprises replacing each of the v elements with a set of s vertices wherein $$s = \text{floor}\left(\frac{d}{k}\right).$$

7. A method for configuring a network, the method comprising:
   identifying a plurality of nodes, each node including a device configured to receive and send data on the network;
   identifying a plurality of switches, each switch being configured to receive and send data on the network;
   selecting a (v, b, r, k, λ) balanced incomplete block design (BIBD), wherein the BIBD includes v elements and b blocks of k elements, each element of the v elements is in r blocks of the b blocks, and each distinct pair of elements of the v elements is in λ blocks of the b blocks;
   scaling the BIBD to create a resulting design having a total number of elements greater than or equal to a total number of nodes, wherein each switch has d available ports and each of the v elements is replaced with a set of s vertices wherein $$s = \text{floor}\left(\frac{d}{k}\right);$$

and
   connecting nodes to switches, including:
      assigning each node to a different element of the resulting design;
      assigning each switch to a different block of the resulting design; and
      for each switch, connecting the switch to the nodes assigned to the elements included in the block assigned to the switch, wherein k*s<d, and one or more remaining ports on a first switch is connected to a different network.

8. The method of claim 7, further comprising scaling the resulting design to create a second resulting design having a total number of blocks equal to a total number of switches, wherein each node has u available ports, r evenly divides u, and scaling the resulting design comprises replacing each block with $$\frac{u}{r}$$

blocks having the same elements as the block.

9. A system comprising:
   a plurality of nodes, each node including a device configured to receive and send data on a network and having u available ports; and
   a plurality of switches, each switch being configured to receive and send data on the network;
   wherein each switch is connected to one or more nodes according to a block design based on a (v, b, r, k, λ) balanced incomplete block design (BIBD), wherein the BIBD is selected based on a plurality of characteristics of the plurality of nodes and the plurality of switches, wherein the BIBD includes v elements and b blocks of k elements, each element of the v elements is in r blocks of the b blocks, and each distinct pair of elements of the v elements is in λ blocks of the b blocks, wherein r is selected based on u and evenly divides u,
   wherein the block design comprises the BIBD scaled to have a total number of blocks equal to a total number of switches by replacing each block with $$\frac{u}{r}$$

blocks having the same elements as the block, and wherein:
   each node is assigned to a different element of the block design;
   each switch is assigned to a different block of the block design; and
   each switch is connected the nodes assigned to the elements included in the block assigned to the switch.

10. The system of claim 9, wherein the block design comprises the BIBD scaled to have a total number of elements greater than or equal to a total number of nodes.

11. The system of claim 10, wherein each switch has d available ports, and the BIBD is scaled by replacing each of the v elements with a set of s vertices wherein $$s = \text{floor}\left(\frac{d}{k}\right).$$

12. The system of claim 9, wherein the plurality of characteristics includes the number of the plurality of nodes, the number of ports available on each node, the number of the plurality of switches, and the number of ports available on each switch.

13. The system of claim 9, wherein the block design comprises the BIBD scaled to create a second block design having a total number of elements greater than or equal to a total number of nodes.

14. The system of claim 13, wherein each switch has d available ports, and the second block design is created by replacing each of the v elements with a set of s vertices wherein $$s = \text{floor}\left(\frac{d}{k}\right).$$

15. A system comprising:
   a plurality of nodes, each node including a device configured to receive and send data on a network; and
   a plurality of switches, each switch being configured to receive and send data on the network;
   wherein each switch is connected to one or more nodes according to a block design based on a (v, b, r, k, λ) balanced incomplete block design (BIBD), wherein the BIBD includes v elements and b blocks of k elements, each element of the v elements is in r blocks of the b blocks, and each distinct pair of elements of the v elements is in λ blocks of the b blocks, wherein the block design comprises the BIBD scaled to have a total number of elements greater than or equal to a total number of nodes, wherein each switch has d available ports and the BIBD is scaled by replacing each of the v elements with a set of s vertices wherein $$s = \text{floor}\left(\frac{d}{k}\right),$$

and wherein:
- each node is assigned to a different element of the block design;
- each switch is assigned to a different block of the block design; and
- each switch is connected the nodes assigned to the elements included in the block assigned to the switch, wherein k*s<d, and one or more remaining ports on a first switch is connected to another network.

16. The system of claim 15, wherein the block design comprises the BIBD scaled to create a second block design having a total number of blocks equal to a total number of switches, and wherein each node has u available ports, r evenly divides u, and the second block design is created by replacing each block with $$\frac{u}{r}$$

blocks having the same elements as the block.

* * * * *